United States Patent [19]
Solomon

[11] Patent Number: 5,244,361
[45] Date of Patent: Sep. 14, 1993

[54] PUMP FOR REVERSE OSMOSIS SYSTEM
[75] Inventor: Donald F. Solomon, Hemet, Calif.
[73] Assignee: Product Research and Development, Santa Ana, Calif.
[21] Appl. No.: 872,620
[22] Filed: Apr. 22, 1992
[51] Int. Cl.5 .................. F04B 21/00; B01D 61/08
[52] U.S. Cl. ..................................... 417/403; 210/134
[58] Field of Search ..................... 417/402, 403, 401

[56] References Cited
U.S. PATENT DOCUMENTS

| | | | |
|---|---|---|---|
| 2,500,624 | 3/1950 | Bailey | 417/401 |
| 3,737,254 | 6/1973 | Swatty | 417/403 |
| 3,825,122 | 7/1974 | Taylor . | |
| 3,937,241 | 2/1976 | Cloup | 417/403 X |
| 3,988,967 | 11/1976 | Orzel . | |
| 4,124,488 | 11/1978 | Wilson . | |
| 4,187,173 | 2/1980 | Keefer . | |
| 4,288,326 | 9/1981 | Keefer . | |
| 4,348,161 | 9/1982 | Shibata | 417/403 |
| 4,367,140 | 1/1983 | Wilson . | |
| 4,410,301 | 10/1983 | Westmoreland | 417/403 X |
| 4,410,429 | 10/1983 | Harvey et al. . | |
| 4,432,876 | 2/1984 | Keefer . | |
| 4,498,982 | 2/1985 | Skinner . | |
| 4,632,754 | 12/1986 | Wood . | |
| 4,645,599 | 2/1987 | Fredkin . | |
| 4,832,071 | 5/1989 | Rehfeld | 417/403 X |
| 4,836,924 | 6/1989 | Solomon | 210/321.87 |
| 4,924,671 | 5/1990 | Reinert . | |
| 4,995,793 | 2/1991 | Solomon | 417/403 |
| 5,008,845 | 3/1991 | Solomon | 210/134 |
| 5,009,777 | 4/1991 | Solomon | 210/134 |

FOREIGN PATENT DOCUMENTS

| | | | |
|---|---|---|---|
| 120714 | 1/1931 | Austria | 417/402 |
| 1176572 | 10/1984 | Canada . | |
| 0028913 | 11/1980 | European Pat. Off. . | |
| 3101694 | 8/1982 | Fed. Rep. of Germany . | |
| 2088968 | 10/1980 | United Kingdom . | |

Primary Examiner—Richard E. Gluck
Attorney, Agent, or Firm—Gordon L. Peterson

[57] ABSTRACT

A pump connectible to fluid under pressure comprising a housing having a cavity and a differential area piston reciprocable in the cavity on pumping and reset strokes and dividing the cavity into an inlet chamber, an outlet chamber and a reversing chamber. The housing has an inlet port communicating with the inlet chamber and connectible to the fluid under pressure, a water port communicating with the outlet chamber and a reversing port communicating with the reversing chamber. The piston has a passage leading from the inlet chamber to the outlet chamber. A first valve opens and closes the passage and a second valve is provided in the housing. A cam assembly opens and closes the first and second valves as a function of the position of the piston in the cavity.

20 Claims, 4 Drawing Sheets

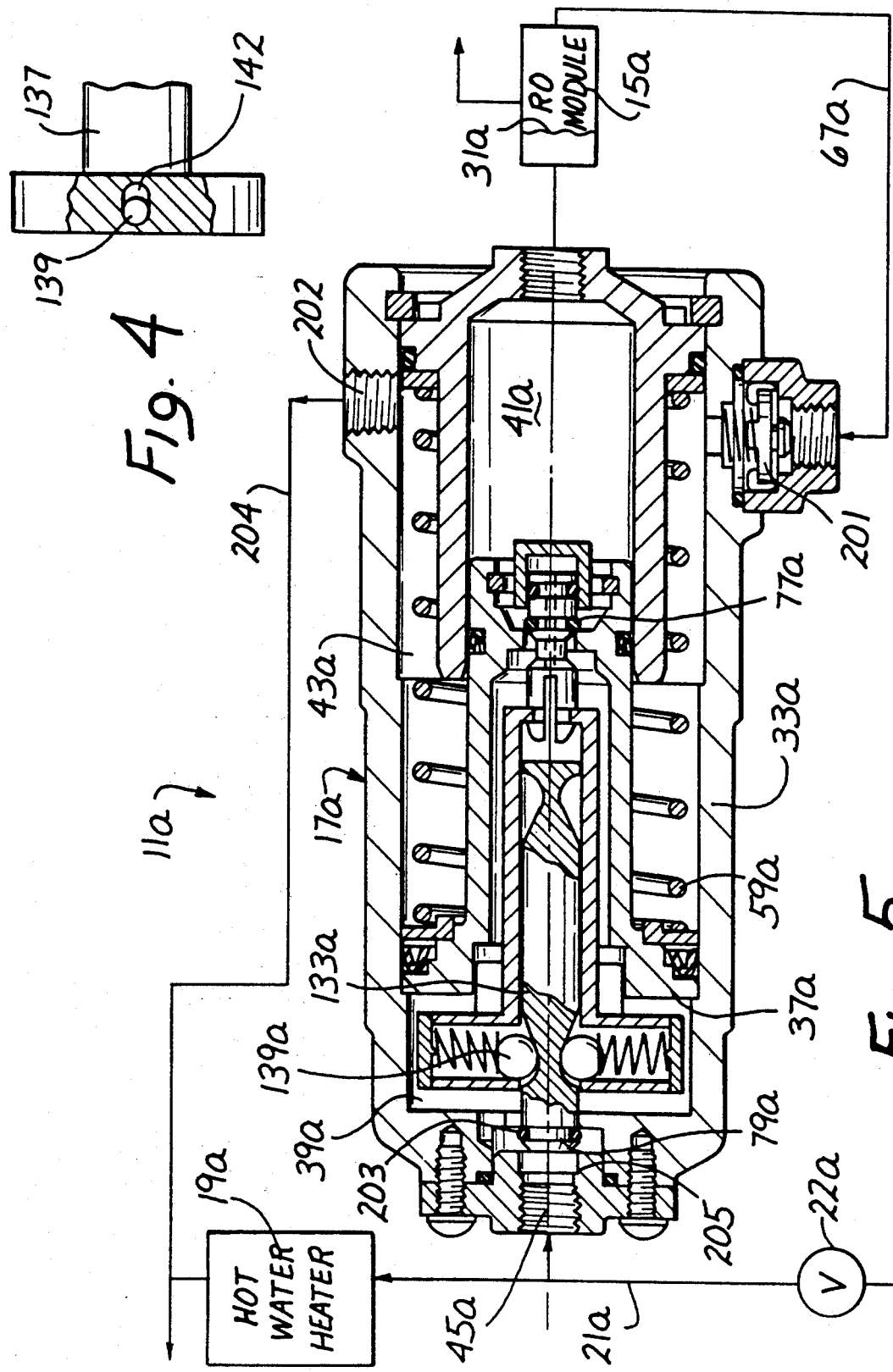

PUMP FOR REVERSE OSMOSIS SYSTEM

BACKGROUND OF THE INVENTION

When a pump receives fluid under pressure, it may use this fluid under pressure to drive the pump. One example is a pressure intensifier described in Solomon U.S. Pat. No. 4,995,793 which increases the pressure of the feedwater by some desired ratio. Another pump of this type is an injector pump which reduces the pressure of the feedwater, and a pump of this type is shown in Solomon U.S. Pat. No. 5,009,777. In both cases, the pressure of the feedwater is the source of energy for driving the pump and so no electric motor or wiring is required. This makes pumps of this type desirable for many applications including reverse osmosis water systems which are used for removing impurities from water, such as drinking water.

Pumps of this type are commonly reciprocating and have a piston which moves on pumping and reset strokes. One important consideration in a pump of this kind is to assure that the piston does not "hang up" or stall at the end of a stroke. In other words, it is important that the piston properly switch from each pumping stroke to a reset stroke and from each reset stroke to the next pumping stroke.

Another consideration is charging of the outlet chamber with feedwater during a reset stroke so that this water can be pumped out of the outlet chamber during the next pumping stroke. On way to accomplish this is with a check valve as shown in Solomon U.S. Pat. No. 4,995,793. Another way to accomplish this is by using a valve external to the pump or by a spool valve as shown by way of example in Solomon U.S. Pat. No. 5,009,777.

SUMMARY OF THE INVENTION

This invention provides a pump having a passage in the piston leading from the inlet chamber to the outlet chamber and a valve operable by a cam assembly for opening and closing the passage. The cam assembly positively controls the opening and closing of the passage as a function of the position of the piston in the cavity. Accordingly, it is not necessary to rely upon the fluid pressure changes necessary to operate a check valve nor are the losses commonly associated with a check valve present. The passage in the piston provides a direct passage from the inlet chamber to the outlet chamber and so no long or external passages are needed to accomplish recharging of the outlet chamber with feedwater.

Another feature of this invention is the technique which reduces the likelihood of the piston hanging up between strokes. This feature of the invention can be employed with or without the passage in the piston and the associated valve.

The features of this invention can be advantageously incorporated into a pump which includes a pump having a cavity and a differential area piston reciprocable in the cavity on pumping and reset strokes and dividing the cavity into an inlet chamber, an outlet chamber and a reversing chamber. The housing has an inlet port communicating with the inlet chamber and connectible to a source of fluid under pressure such as feedwater, a water port communicating with the outlet chamber and a reversing port communicating with the reversing chamber. A reset spring urges the piston to move on the reset stroke.

The cam assembly preferably includes an elongated member in the housing with the elongated member having first and second cam surfaces, a carrier coupled to the piston for movement with the piston on pumping and return strokes, a cam follower carried by the carrier and biasing means for resiliently biasing the cam follower toward the elongated member. The cam follower cooperates with the first cam surface during an initial portion of the pumping stroke to store energy in the biasing means. It is important that this cooperation occur during the initial portion of the pumping stroke when the reset spring acts to only lightly resist piston travel on the pumping stroke. With the reset spring exerting only a light force against the piston, the energy required to cock or energize the biasing means is obtained when ample force is available and at a time when it cannot contribute to hang up or stalling of the piston.

The cam follower also cooperates with the second cam surface near the end of the pumping stroke for providing valve operating motion. The energy for the valve operating motion is the energy stored in the biasing means at the beginning of the pumping stroke. This stored energy is released by the second cam surface near the end of the pumping stroke for providing this valve operating motion.

Although the valve operating motion can be used to operate a valve for any purpose, preferably it operates one or more valves to bring about, or help bring about, reversing or switching of the direction of motion of the piston from the pumping stroke to the reset stroke. Because this valve operating motion to bring about switching of the direction of motion of the piston is simply a release of previously stored energy, it does not use any energy needed at that moment to drive the piston and so hang up or stalling is much less likely to occur.

The cam follower also cooperates with the second cam surface during an initial portion of the return stroke when the reset spring has substantial energy to store energy in the biasing means. Thus, energy is taken out of the system and stored in the biasing means when there is an ample supply of energy and when switching of the piston is not imminent. Also, the cam follower cooperates with the first cam surface near the end of the reset stroke for providing valve operating motion. This valve operating motion may be used to operate any valve; however, it preferably is used to operate one or more valves which bring about, or assist in bringing about, switching of the piston from the reset stroke to the pumping stroke.

The valve operating motion can advantageously be provided to one or both of the carrier and the elongated member. In a preferred embodiment, a first valve is operable in response to the valve operating motion of the carrier and a second valve is operable in response to the valve operating motion of the elongated member. To accomplish this, preferably the carrier is movable relative to the piston and the elongated member is also movable.

Another feature which reduces the likelihood of stalling the piston at one end of a stroke is to have the carrier loosely retain the cam follower in the direction of elongation of the elongated member. This enables the cam follower to move rapidly to a location on the cam surface where it can act more fully to bring about the valve operating motion.

Preferably, the features of this invention are employed together in which event the first valve includes a valve element driven by the carrier to open the passage in response to the valve operating motion derived from the second cam surface and to close the passage in response to the valve operating motion derived from the first cam surface. The second valve may, for example, control the flow of fluid to and from the reversing chamber so that both of the valves are intimately involved with the switching function of the piston. In this event, the second valve may include a passage in the housing and a spool driven by the valve operating motion Alternatively, the second valve may include a port in the housing leading to the inlet chamber and a valve element driven by the valve operating motion. This also is a controlling factor for the reversing of the piston.

Various different constructions can be employed for the various elements of the pump. In a preferred construction, the carrier includes a sleeve at least partially receiving the elongated member.

BRIEF DESCRIPTION OF THE DRAWINGS

FIG. 4 is an enlarged fragmentary sectional view taken generally along lines 4—4 of FIG. 1.

FIG. 5 is a view similar to view 1 illustrating a second form of pump constructed in accordance with the teachings of this invention. The piston of the pump in FIG. 5 is at the beginning of the pumping stroke.

DESCRIPTION OF THE PREFERRED EMBODIMENTS

The pump of this invention can be used in various different systems. One preferred usage of the pump is in a hot water system 11 where the pump functions as an injector pump as shown in Solomon U.S. Pat. No. 5,009,777.

Figure 1:
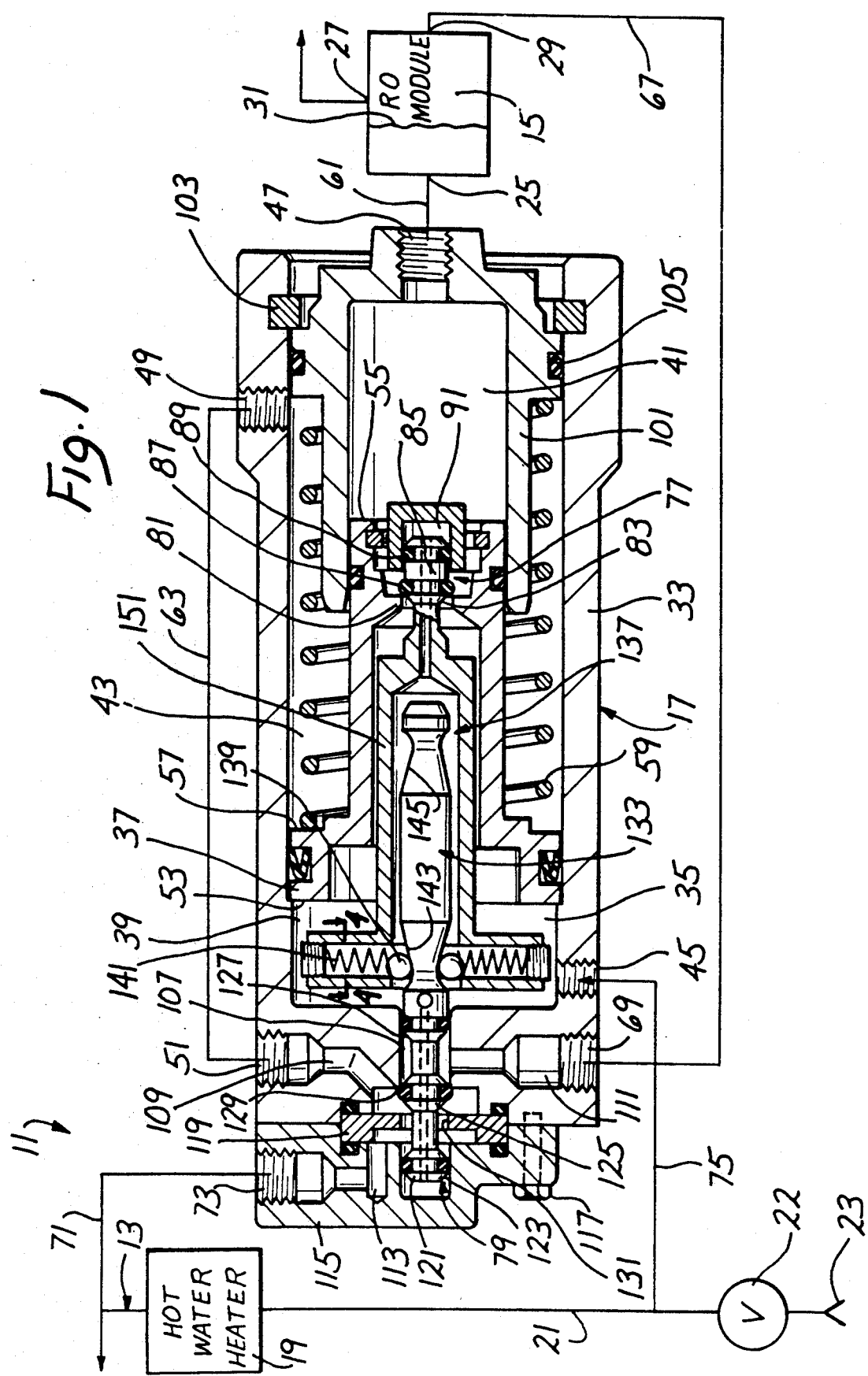
FIG. 1 is a schematic illustration of a reverse osmosis water system embodying a pump constructed in accordance with the teachings of this invention. The pump, which is illustrated in longitudinal section, is shown with the piston at the beginning of the pumping stroke.

FIG. 1 shows the water system 11 which generally comprises a hot water system 13, a reverse osmosis module or filter 15 and an injector pump 17. The hot water system 13 includes a hot water heater 19 and conduit means 21 which lead from a manually operable supply valve 22 and a source 23 of feedwater, such as a city water supply, to the hot water heater 19 and from the hot water heater 19. The hot water heater 19 may be the conventional gas or electric hot water heater commonly found in residences.

The reverse osmosis module 15 is conventional and includes an inlet port 25, a product water port 27 for filtered product water and a brine outlet port 29 for brine. The module 15 also includes a reverse osmosis membrane 31.

The injector pump 17, which is shown somewhat schematically in FIG. 1, includes a housing 33 having a cavity 35 and a differential area piston 37 reciprocable in the cavity through pumping and reset strokes and dividing the cavity into an inlet chamber 39, an outlet chamber 41 and a reversing chamber 43.

The housing 33 has a feedwater inlet port 45 communicating with the inlet chamber 39, a water port 47 communicating with the outlet chamber 41, a reversing or brine port 49 communicating with the reversing chamber 43 brine port 49 communicating with the reversing chamber 43 and a flushing port 51.

The piston 37 has a large-area inlet face 53 in the inlet chamber 39, a second smaller-area outlet face 55 in the outlet chamber 41 and a reversing face 57 in the reversing chamber 43. A reset spring 59 acts against the reversing face 57 to urge the piston 37 to the left as viewed in FIG. 1 on its reset stroke.

A tube 61 couples the water port 47 to the inlet port 25 of the module 15. A tube 63 couples the flushing port 51 to the brine port 49. A tube 67 joins the brine outlet port 29 of the module 15 to a port 69 of the housing 33. A conduit 71 couples a discharge port 73 of the housing 33 into the conduit means 21 downstream of the hot water heater 19. A conduit 75 couples the inlet port 45 to the conduit 21 between the valve 22 and the hot water heater 19.

The pump 17 includes a first or piston valve 77 and a second or brine valve 79. The purpose of the piston valve 77 is to open on the reset stroke, i.e. when the piston 37 is moving to the left on the reset stroke to allow feedwater from the source 23 to flow through the conduit 75, the inlet port 45, the inlet chamber 39 and the valve 77 to the outlet chamber 41. During the pumping stroke the piston valve 77 is closed as shown in FIG. 1 so that as the piston 37 moves to the right as viewed in FIG. 1 on the pumping stroke, it can pump water from the outlet chamber 41 through the water port 47 and the tube 61 to the inlet port 25 of the module 15.

The piston has an end wall 81 and a passage or port 83 extends through the end wall. The valve 77 includes a valve element 85, which may include annular seals 87 and 89 for opening and closing the passage 83. The valve element 85 is movable between a closed position shown in FIG. 1 and an open position shown in FIGS. 2 and 3. In the closed position, the seal 87 seats on a surface surrounding the rim of the passage 83. The seal 89 slides in a chamber 91 which is mounted on the piston 37 in any suitable manner such as by a retaining ring 93.

The piston 37 also includes a hollow stem 95 (FIG. 3) which terminates in the end wall 81. Seals 97 and 99 seal the interfaces between the stem 95 and a sleeve 101, which is suitably retained in the housing 33 by a retaining ring 103 and the reset spring 59, and between the piston 37 and the housing 33, respectively. A seal 105 seal the interface between the housing 33 and the sleeve 101.

The cavity 35 also includes a valve spool cavity 107 which communicates with the ports 51, 69 and 73 via passages 109, 111 and 113, respectively. In this embodiment, the housing 33 has an end cap 115 suitably attached as by threaded fasteners 117 (only one being illustrated in FIG. 1) to the main body of the housing 33 and a plate 119 is clamped between the end cap 115 and the main body of the housing 33 and retained between O-ring seals as shown in FIGS. 1 and 2.

Figure 2:
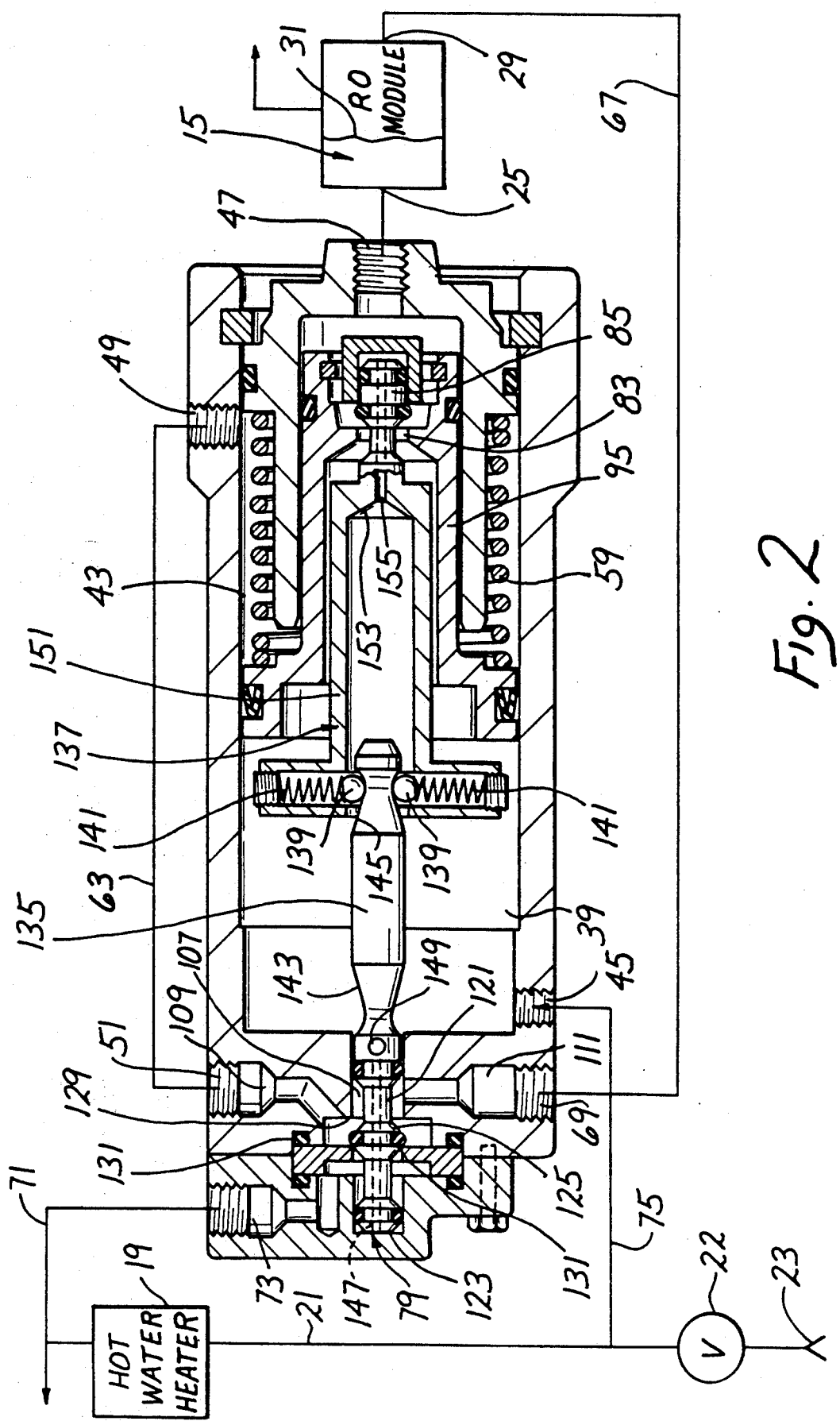
FIG. 2 is a view similar to FIG. 1 with the piston about to begin the reset stroke.
Figure 3:
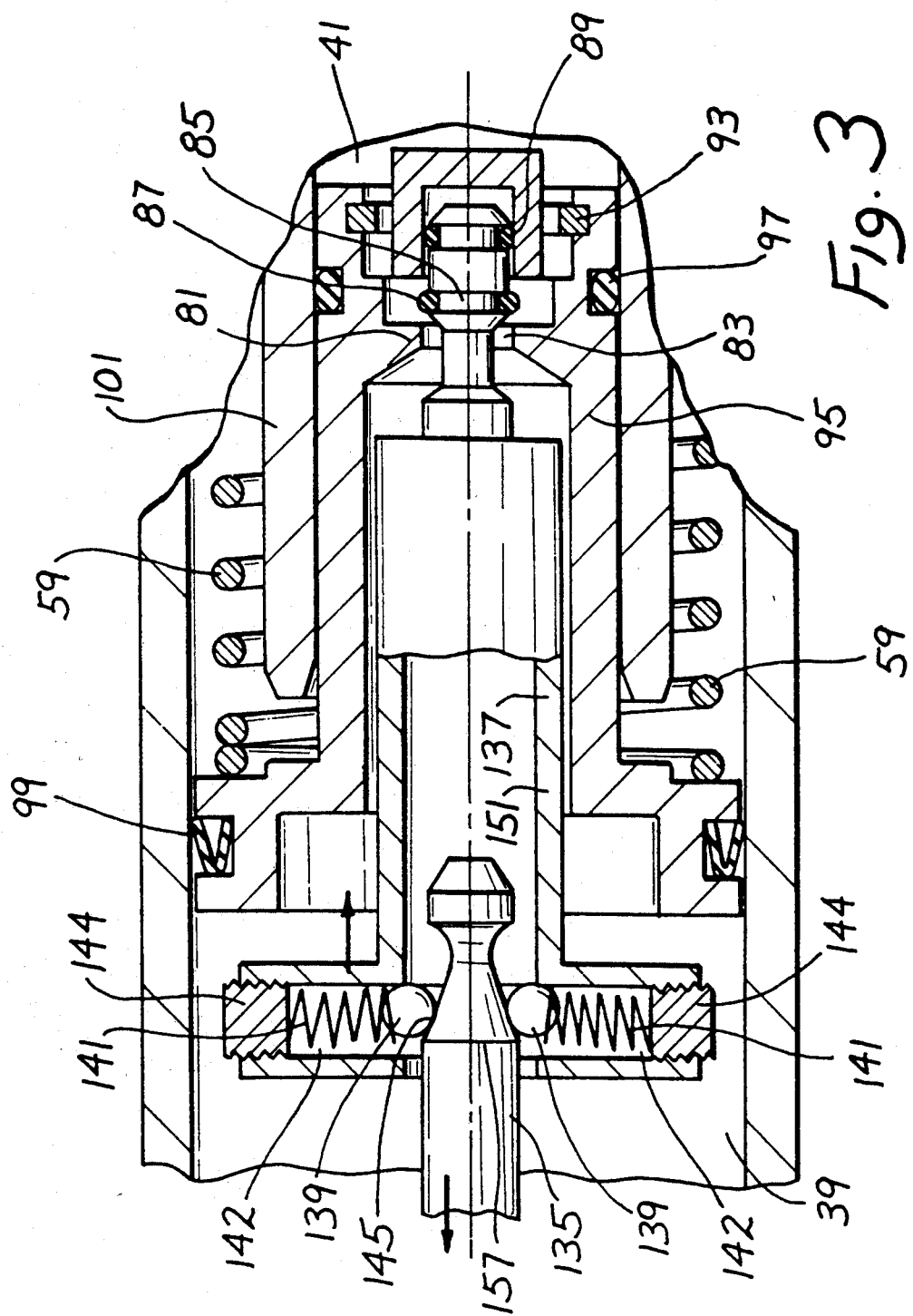
FIG. 3 is a enlarged fragmentary sectional view showing a portion of FIG. 1 and illustrating how the stored energy is released to provide valve operating motion.

The brine valve 79 provides communication between the ports 51 and 73 while blocking the port 69 from the spool cavity 107 as shown in FIG. 1 or provides communication between the ports 51 and 69 while sealing off the port 73 from communication with the ports 51 and 69 and shown in FIG. 2. More specifically, on the pumping stroke (FIG. 1), brine in the reversing chamber 43 flows through the port 49, the tube 63, the port 51, the passage 109, the spool cavity 107, the passage 113 and the port 73 to the conduit 71 so that the brine is discharged at high pressure into the hot water system 13 downstream of the hot water heater 19. On the return stroke, the brine valve 79 allows brine to flow from the brine outlet port 29 of the module 15 through the tube 67, the port 69, the passage 111, the spool cavity 107, the passage 109, the port 51, the tube 63 and the port 49 to the reversing chamber 43 to charge the reversing chamber with a new supply of brine as shown in FIG. 2.

The brine valve 79 includes a spool 121 slidable in the spool cavity 107 and having three lands 123, 125 and 127 separated axially by grooves and carrying O-ring seals. In the position of FIG. 1, the O-ring seal of the land 125 seats against a valve seat 129 formed on the valve housing 33 and in the position of FIG. 2, the O-ring on the land 125 seats on a valve seat 131 surrounding an aperture through the plate 119.

Both of the valves 77 and 79 are operated by a cam assembly 133, and both of these valves are used to bring about reversing of motion of the piston 37. The cam assembly 133 includes an elongated member in the form of a rod 135, a carrier 137 coupled to the piston 37 for movement with the piston 37, a cam follower in the form of a plurality of balls 139 (two being illustrated in FIGS. 1-3) and springs 141 retained in pockets 142 in the carrier 137 for resiliently biasing the balls 139 toward the rod 135. The pockets 142 are elongated in the direction of elongation of the rod 135 and in the direction in which the cam surfaces 143 and 145 are inclined to thereby loosely retain the associated balls 139 in such direction. Each of the pockets 142 is cylindrical at its outer end so it can threadedly receive a spring tension adjustment nut 144. The rod 135 has axially spaced conical cam surfaces 143 and 145 on the exterior of the rod adjacent its opposite ends. Between the cam surfaces 143 and 145, the rod 135 is cylindrical. One end of the rod 135 is coupled to, and in this embodiment integral with, the spool 121. The rod 135 and spool 121 have a passage 147 (FIG. 2) extending completely through the spool and opening at a port 149 so that the land 123 can move in its portion of the spool cavity 107 which, as shown in FIGS. 1 and 2, is blind or closed at the left end. The land 123 and the face movable in the blind chamber 91 may be of equal area to create balanced forces on the cam assembly 133.

The carrier 137 includes a sleeve 151 which receives a portion of the rod 135 and a substantial length of the rod when the piston 37 is at the beginning of the pumping stroke as shown in FIG. 1. The sleeve 151 has an end wall 153 (FIG. 2) with a passage 155 leading completely through the valve element 85 to the blind chamber 91.

In operation, the water system 11 is first primed in a conventional manner to fill all of the regions of the system which are to carry water with water. With the piston 37 at the left end of its path of travel, the valves 77 and 79 are closed. The inlet chamber 39 is then supplied with feedwater under pressure by opening the supply valve 22 to allow water to flow from the source 23 into the inlet chamber 39 to act on the large-area face 53 and urge the piston 37 to the right on its pumping stroke. However, travel of the piston 37 to the right is resisted by essentially line pressure in the reversing chamber 43, the reset spring 59 and the pressure in the outlet chamber 41. However, the pressure in the outlet chamber 41 acts on the reverse osmosis module 15 to begin the production of product water, and when this occurs, the pressure in the outlet chamber 41 drops sufficiently so that the feedwater under pressure in the inlet chamber 39 can move the piston 37 to the right on its pumping stroke. As the pumping stroke progresses, the water in the reversing chamber 43, which will be brine after system startup is completed, is forced out through the brine port 49 at a pressure greater than the pressure of the feedwater so that the water (brine after the completion of the startup procedure) is injected into the hot water system at the conduit means 21. In addition, the small-area face 55 of the piston 37 provides water to the water port 47 of the injector pump, and this is supplied to the inlet port 25 of the reverse osmosis module via the tube 61 so that the production of product water can continue With this system, the feedwater under pressure is the only energy utilized for boosting the pressure of the brine which is injected into the conduit means 21. The injector pump 17 boosts the pressure of the brine above feedwater pressure and reduces the pressure of the water furnished to the inlet port 25 of the module 1 5 Because the brine valve 79 shuts off the port 69, there is no brine flow in the tube 67. Also, because the valve 77 in the piston is closed, there is no flow of feedwater from the inlet chamber 39 to the outlet chamber 41.

As the piston 37 moves to the right on the pumping stroke, it pulls the carrier 137 with it by virtue of the seating of the seal 87 against the end wall 81 of the piston 37. Consequently, the balls 139 ride up on the cam surface 143, which is of progressively increasing diameter in that direction, to compress the springs 141. This occurs during the first increment of motion of the piston 37 on the pumping stroke when the reset spring 59 is exerting a relatively small force against the piston. Consequently, the energy removed from the system that is stored in the compressed springs 141 is taken out of the system at a time when there is a relative abundance of energy to move the piston 37 to the right and when reversing the direction of piston movement is not imminent.

As the piston 37 and the carrier 137 continue their movement on the pumping stroke, the balls 139 ride along the cylindrical region of the rod 135 between the cam surfaces 143 and 145. The balls 139 each have essentially point contact with the rod 135. When this point contact reaches a division line 157 (FIG. 3) between the cylindrical surface of the rod and the conical cam surface 145, the balls, by virtue of the oversized pockets 142 are instantly forced to the right to the position shown in FIG. 3 so that the point contact between each of the balls and the cam surface 145 is well beyond the division line 157. In this position, the balls can exert the full camming force. Because the cam surface 145 slopes inwardly toward the axis of the rod 135, the balls push the rod 135 to the left and exert an equal and opposite reaction force against the carrier 137 pushing the carrier to the right. Thus, the balls 139 cooperate with the cam surface 145 near the end of the pumping stroke for providing valve operating motion, in this case to both the rod 135 and the carrier 137. Specifically, movement of the carrier 137 to the right opens the piston valve 77 to provide communication between the inlet chamber 39 and the outlet chamber 41. In addition, movement of the rod 135 to the left moves the spool 121 and the land 125 thereof off of the valve set 129 and on to the valve seat 131 as shown in FIG. 2. Consequently, brine can now flow from the brine outlet port 29 of the module 15 through the ports 69 and 51 to the reversing chamber 43.

With the valves 77 and 79 in this position of FIG. 2, the entire system, i.e. the chambers 39, 41 and 43 and the tubes 61, 63 and 67 are all at essentially line or feedwater pressure. Consequently, the hydraulic forces acting on the piston 37 are balanced so that the reset spring 59 forces the piston 37 to the left on the reset stroke. Movement of the piston 37 to the left on its reset stroke forces feedwater out of the inlet chamber 39 through the valve 77 to the outlet chamber 41 to keep the outlet chamber full as the piston continues its leftward movement. The water supplied to the module 15 flushes the membrane 31, and this flush water or brine passes through the tube 67, the valve 79 and the tube 63 to the reversing chamber 43.

The balls 139 cooperate with the cam surface 145 during the initial increment of motion of the return stroke to cam the balls outwardly and compress the springs 141 to store energy in them. This is done when the reset spring 59 has substantial energy to move the piston 37 so that the energy is taken out of the system when there is ample energy available. Moreover, this occurs when reversal of the motion of the piston 37 is not about to occur so that the energy is not taken out of the system when stalling is most likely to take place.

As the balls 139 reach the cam surface 143, the action described above is repeated except that the motions are reversed such that the carrier 137 is moved to the left to close the valve 77 and the rod 135 and spool 121 are moved to the right to return that valve to the position of FIG. 1.

FIG. 5 shows a system 11a which is identical to the system 11 in all respects not shown or described herein. Portions of the system 11 corresponding to portions of the system 11a are designated by corresponding reference numerals followed by the letter a. The primary difference between the systems 11a and 11 is that the valve 79a controls the flow of water from the source 23a into the inlet chamber 39a through the inlet port 45a, and the flow of brine from the module 15a and the tube 67a into the reversing chamber 43a is controlled by a check valve 201 carried by the pump housing 33a and by the pressures in the system 11a. Also, the housing 33a has a discharge port 202 leading to the reversing chamber 43a and a conduit 204 coupled to discharge port 202 and to the conduit means 21a downstream of the hot water heater 19a. The cam assembly 133a functions in the same manner as the cam assembly 133 to close the piston valve 77a and open the valve 79a at the end of the reset stroke and to open the piston valve 77a and close the valve 79a at the end of the pumping stroke.

The operation of the system 11a on the pumping stroke is the same as that described above for the system 11 except that the check valve 201 is maintained in a closed position so that brine from the tube 67a cannot enter the reversing chamber 43a by virtue of the higher pressure existing in the reversing chamber during the pumping stroke. On the reset stroke, the piston 37a is urged to the left by the reset spring 59a. During this time, the valve 77a is open and the valve 79a is closed to shut off the supply of water from the source 23. As the piston 37a moves on the reset stroke, it sweeps water out of the inlet chamber 39a and this water flows through the open valve 77a into the outlet chamber 41a. Because the volume of the inlet chamber 39a exceeds the volume of the outlet chamber 41a, the excess water is forced through the module 15a to flush the membrane 31a and from there flows through the tube 67a and the check valve 201 to the reversing chamber 43a. On the reset stroke, the pressure in the reversing chamber 43a is relatively low and so the check valve 201 is readily opened by the fluid or brine from the tube 67a.

It should be noted that the valve 79a has an O-ring 203 which seats on a valve seat 205 in the closed position. Thus, the O-ring 203 does not enter and slid along a bore in the manner of a spool valve and is therefore not subject to the frictional loses of a spool valve.

Although exemplary embodiments of the invention have been shown and described, many changes, modifications and substitutions may be made by one having ordinary skill in the art without necessarily departing from the spirit and scope of this invention.

I claim:

1. A pump connectible to a source of fluid under pressure comprising:
   a housing having a cavity and a differential area piston reciprocable in the cavity on pumping and reset strokes and dividing the cavity into an inlet chamber, an outlet chamber and a reversing chamber, said piston having an inlet face in the inlet chamber, an outlet face in the outlet chamber and a reversing face in the reversing chamber, said inlet face being of larger area than the outlet face;
   said housing having an inlet port communicating with the inlet chamber and connectible to the source of fluid under pressure, a water port communicating with the outlet chamber and a reversing port communicating with the reversing chamber;
   said piston having a passage leading from the inlet chamber to the outlet chamber;
   a first valve for opening and closing said passage; and
   a cam assembly for opening and closing said first valve as a function of the position of the piston in the cavity.

2. A pump as defined in claim 1 including a second valve in said housing, said cam assembly operating said second valve as a function of the position of the piston in the cavity.

3. A pump as defined in claim 2 wherein the cam assembly includes an axially movable elongated member having first and second cam surfaces, a carrier coupled to the first valve and a cam follower carried by the carrier and biased toward the elongated member, the cam follower cooperating with the cam surface to open and close the first valve and to operate the second valve.

4. A pump as defined in claim 1 wherein the cam assembly includes an elongated member, having first and second cam surfaces, a carrier coupled to the first valve and a cam follower carried by the carrier and biased toward the elongated member, the cam follower cooperating with the cam surface to open and close the first valve.

5. A pump as defined in claim 4 wherein the carrier includes a sleeve at least partially receiving the elongated member.

6. A pump connectible to a source of fluid under pressure comprising:
   a housing having a cavity and a differential area piston reciprocable in the cavity on pumping and reset strokes and dividing the cavity into an inlet chamber, an outlet chamber and a reversing chamber, said piston having an inlet face in the inlet chamber, an outlet face in the outlet chamber and a reversing face in the reversing chamber, said inlet face being of larger area than the outlet face;

said housing having an inlet port communicating with the inlet chamber and connectible to the source of fluid under pressure, a water port communicating with the outlet chamber and a reversing port communicating with the reversing chamber, said piston being movable on the pumping stroke by the fluid under pressure;

a reset spring for urging the piston to move on the reset stroke;

an elongated member in said housing, said elongated member having first and second cam surfaces;

a carrier coupled to the piston for movement with the piston;

a cam follower carried by the carrier;

means for resiliently biasing the cam follower toward the elongated member;

said cam follower cooperating with the first cam surface during an initial portion of the pumping stroke to store energy in the biasing means;

said cam follower cooperating with the second cam surface near the end of the pumping stroke for providing valve operating motion to at least one of the carrier and the elongated member; and a first valve carried by the housing and operable in response to said valve operating motion, the operation of the first valve at least assisting in causing the piston to reverse.

7. A pump as defined in claim 6 wherein the carrier is movable relative to the piston and said one of the carrier and elongated member is the carrier.

8. A pump as defined in claim 6 wherein the elongated member is movable and said one of the carrier and elongated member is the elongated member.

9. A pump as defined in claim 6 wherein the cam follower cooperates with the second cam surface near the end of the pumping stroke for providing valve operating motion to the carrier and the elongated member, said first valve being operable in response to the valve operating motion of the carrier, and said pump includes a second valve operable in response to the valve operating motion of the elongated member.

10. A pump as defined in claim 6 wherein the carrier loosely retains the cam follower in the direction of elongation of the elongated member.

11. A pump as defined in claim 6 wherein the cam follower cooperates with the second cam surface during an initial portion of the return stroke when the reset spring has substantial energy to store energy in the biasing means and cooperates with the first cam surface near the end of the reset stroke for providing valve operating motion to either or both of the carrier and the elongated member.

12. A pump as defined in claim 11 wherein there is a passage in the piston and the first valve includes a valve element driven by the carrier to open the passage in response to the valve operating motion derived from the second cam surface and to close the passage in response to the valve operating motion derived from the first cam surface.

13. A pump as defined in claim 12 wherein the carrier includes a sleeve which at least partially receives the elongated member and at least the second cam surface at the beginning of the pumping stroke.

14. A pump as defined in claim 6 wherein said first valve includes a passage in the housing and a spool driven by the valve operating motion.

15. A pump as defined in claim 6 wherein the first valve includes a port in the housing leading to the inlet chamber and a valve element driven by the valve operating motion.

16. A pump connectible to a source of fluid under pressure comprising:

a housing having a cavity and a differential area piston reciprocable in the cavity on pumping and reset strokes and dividing the cavity into an inlet chamber, an outlet chamber and a reversing chamber, said piston having an inlet face in the inlet chamber, an outlet face in the outlet chamber and a reversing face in the reversing chamber, said inlet face being of larger area than the outlet face;

said housing having an inlet port communicating with the inlet chamber and connectible to the source of fluid under pressure, a water port communicating with the outlet chamber and a reversing port communicating with the reversing chamber, said piston being movable on the pumping stroke by the fluid under pressure;

a reset spring for urging the piston to move on the reset stroke;

means for storing energy during an initial portion of the pumping stroke;

means driven by the stored energy near the end of the pumping stroke for providing valve operating motion; and a first valve carried by the housing and operable in response to said valve operating motion, the operation of the first valve at least assisting in causing the piston to reverse.

17. A pump connectible to a source of fluid under pressure comprising:

a housing having a cavity and a differential area piston reciprocable in the cavity on pumping and reset strokes and dividing the cavity into an inlet chamber, an outlet chamber and a reversing chamber, said piston having an inlet face in the inlet chamber, an outlet face in the outlet chamber and a reversing face in the reversing chamber, said inlet face being of larger area than the outlet face;

said housing having an inlet port communicating with the inlet chamber and connectible to the source of fluid under pressure, a water port communicating with the outlet chamber and a reversing port communicating with reversing chamber, said piston being movable on the pumping stroke by the fluid under pressure;

a reset spring for urging the piston to move on the reset stroke;

an energy storage device for storing energy during an initial portion one of said strokes, the energy storage device releasing the stored energy near the end of said one stroke for providing valve operating motion; and a first valve operable in response to said valve operating motion to at least assist in causing the piston to reverse.

18. A pump as defined in claim 17 wherein said one stoke is the reset stroke.

19. A pump as defined in claim 17 wherein the first valve includes a spool which is driven by the valve operating motion.

20. A pump as defined in claim 17 wherein the energy storage device stores energy during an initial portion of the other of said strokes and releases the stored energy near the end of said other stroke to provide valve operating motion, said first valve is operable in response to the valve operating motion provided near the end of said other stroke to at least assist in causing the piston to reverse.

* * * * *